Sept. 28, 1965 W. H. BAUM ETAL 3,208,330
FASTENER HEAD WITH GROOVES TO RECEIVE DRIVING TOOL RIBS
Filed June 15, 1962 2 Sheets-Sheet 1
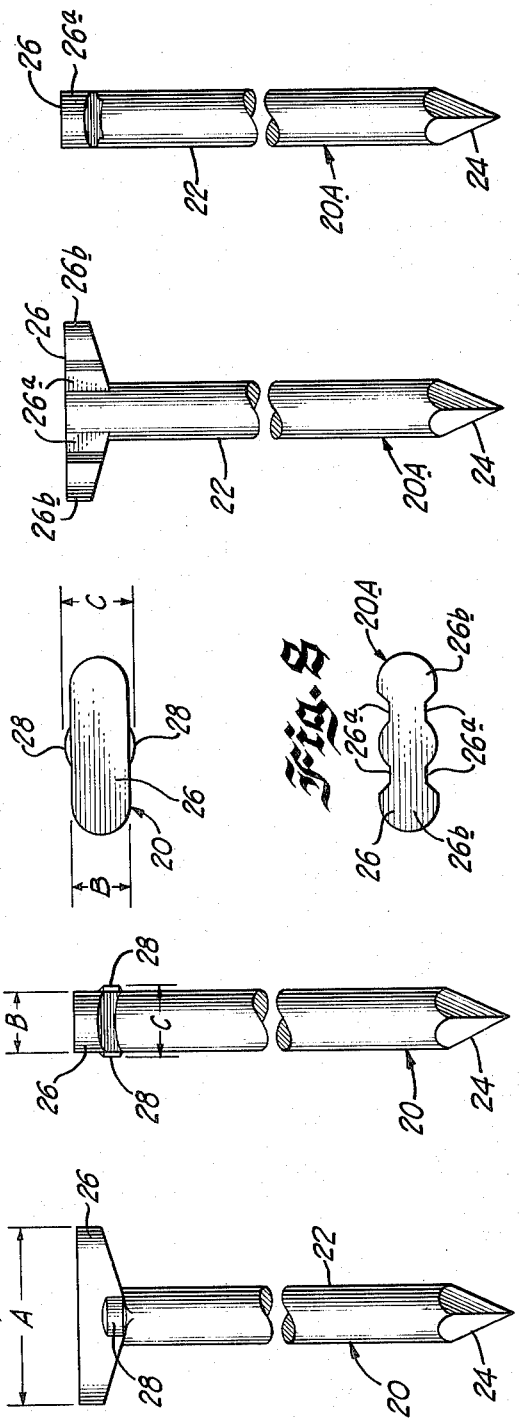
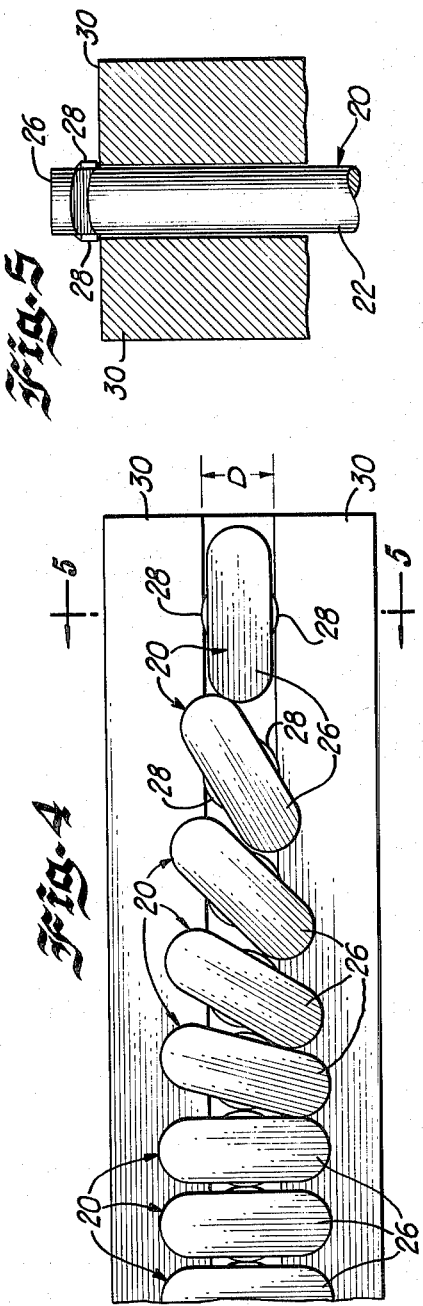
INVENTORS
WILLIAM H. BAUM AND
BY OSCAR A. WANDEL
Mason, Kolehmainen, Rathburn and Wyss
ATTORNEYS.

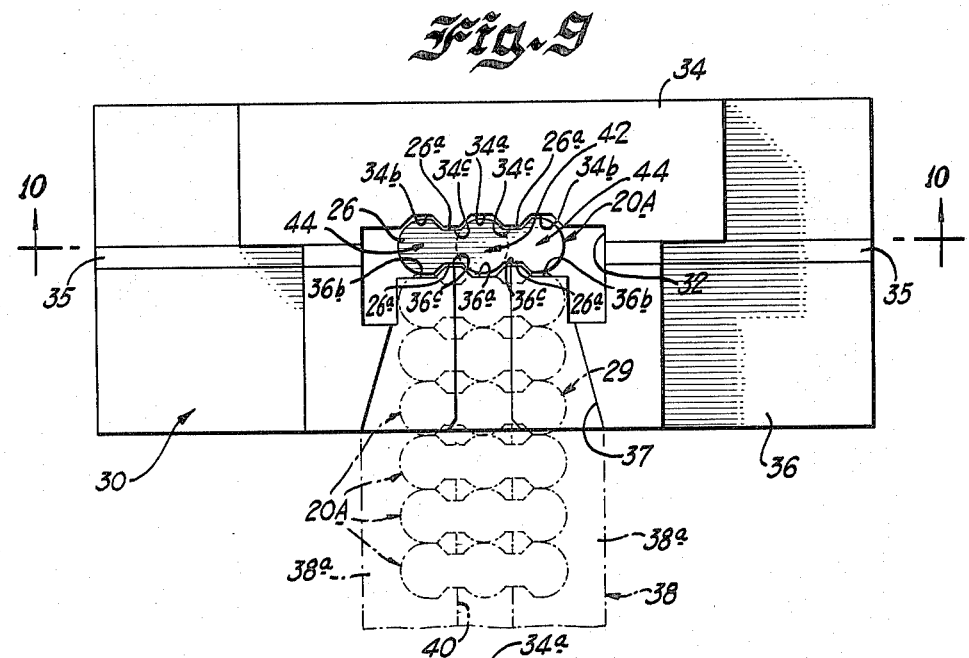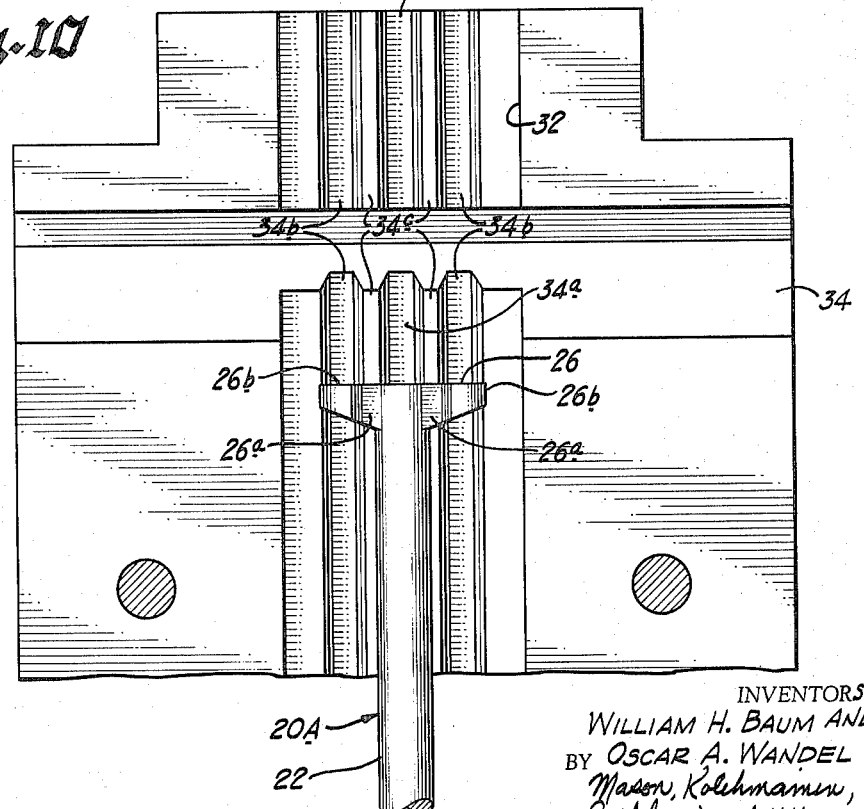

United States Patent Office 3,208,330
Patented Sept. 28, 1965

3,208,330
FASTENER HEAD WITH GROOVES TO RECEIVE DRIVING TOOL RIBS
William H. Baum, Westchester, and Oscar A. Wandel, Mundelein, Ill., assignors to Fastener Corporation, Franklin Park, Ill., a corporation of Illinois
Filed June 15, 1962, Ser. No. 202,915
3 Claims. (Cl. 85—28)

This invention relates to fasteners and apparatus for driving the same. More particularly, it relates to fasteners and power actuated apparatus for driving these fasteners.

When driving fasteners of the type having a single shank and an enlarged head into material such as wood with a power operated tool, it is necessary to apply considerable force to fully drive or set the fastener. In this type of application when fasteners of a large size are used, it is desirable that the shank of the fastener be guided by the drive track of the tool until the fastener is fully driven. Also, it is desirable that the head of the fastener be of sufficient size relative to the shank diameter so that it will effectively hold in the piece of wood or other material into which the fastener is driven and will be able to withstand the driving force without being deformed. It is also desirable that the fasteners may be easily and economically manufactured with close dimensional tolerances so as to prevent the jamming of and malfunction of a driving tool. It is also desirable to provide these fasteners in sticks in which the individual fasteners are glued or cemented together so that the sticks can be quickly and easily inserted into the magazine of a driving tool.

Therefore, it is an object of the present invention to provide a new and improved fastener of the type adapted for use in a power actuated tool which permits the shank of the fastener to be fully supported and guided in the tool during the driving thereof.

Another object of the present invention is to provide a new and improved fastener of the type described above in which the head is of sufficient size and of such shape that it is not deformed durnig the driving and will hold well in the material in which it is driven.

Another object of the present invention is to provide new and improved fasteners of the type described which can be easily and quickly oriented and aligned from jumbled or random oriented states into proper positions to facilitate finishing operations and the cementing of the fasteners in sticks.

Another object of the present invention is to provide a new and improved method of manufacturing fasteners of the type described in an economical and simple manner in which preformed blanks in bulk quantities are dumped into a vibrating hopper and are oriented on rails therein for proper feeding into machinery that performs the final finishing operations.

Another object of the present invention is to provide a new and improved apparatus for driving fasteners of the type described having a drive track or nosepiece in which the shank of the fastener is fully supported against lateral deflection during driving.

The foregoing and other objects of the present invention are realized by providing a new and improved fastener having a generally T-shaped head joined to a cylindrical shank. The width of the head is equal to the diameter of the shank and there are provided on the sides of the head a pair of diametrically opposed bosses which project outwardly from the diameter of the shank and have a lower surface slightly below the bottom of the head. These fasteners are dumped in bulk into a vibrating hopper having a pair of guide rails which are spaced apart by a distance slightly greater than the shank diameter but slightly less than the outer dimension of the fastener across the bosses. As the hopper is vibrated the shanks of the fasteners drop between the rails but the bosses thereon prevent them from dropping through the space between the rails even if the T-shaped heads are aligned with the space between the rails. Continued vibration of the rails causes the fasteners to rotate into a desired position with the T-shaped heads extending transverse to and supported on the rails.

With the fasteners thus properly aligned on the rails, they are sequentially fed into stamping machinery where the shanks are straightened, if needed, and the projecting bosses are removed. The fasteners are then fed into an additional unit of forming equipment where two longitudinally spaced portions on each side of the head adjacent the shank are grooved. The fasteners are then glued or cemented into sticks with the shanks in an abutting relation and with the grooved or notched T-shaped heads in adjacent parallel relation extending transversely to the length of the stick.

The apparatus for driving the fasteners includes a nosepiece or drive track structure having a centrally disposed opening for receiving and guiding the shank portion of the fastener. The drive track also includes two pairs of opposed ribs positioned on opposite sides of the central opening that slidably engage the two pairs of grooves on the T-shaped heads. These interfitting grooves and ribs on the T-shaped head and the drive track structure positively support and guide the fastener through the driving stroke of the tool.

Many other objects and advantages of the present invention will appear from the following detailed description when considered in conjunction with the drawings in which:

FIG. 1 is a front elevational view of a blank used in making a fastener embody the present invention;

FIG. 2 is a side elevational view of the blank shown in FIG. 1;

FIG. 3 is a top view of the blank shown in FIG. 1;

FIG. 4 is a fragmentary top view of a guide rail assembly for orienting the fastener blanks shown in FIG. 1;

FIG. 5 is a sectional view taken along line 5—5 of FIG. 4;

FIG. 6 is a front elevational view of a fastener formed from the fastener blank shown in FIG. 1;

FIG. 7 is a side elevational view of the fastener shown in FIG. 6;

FIG. 8 is a top view of the fastener shown in FIG. 6;

FIG. 9 is a top view of a nosepiece or drive track structure for driving the fastener shown in FIG. 6; and FIG. 10 is a sectional view taken along line 10—10 of FIG. 9.

Referring now to the drawings, there is illustrated a fastener blank (FIGS. 1–3) and a finished fastener 20A (FIGS. 6–8) which embody the present invention. The fastener blank 20 is provided with a cylindrical shank 22 having a pointed lower end 24 which can be of the standard diamond point type. The upper end of the fastener blank is provided with a head 26 having a longitudinal dimension "A" somewhat larger than the diameter of the shank 22, and a width "B" equal to the diameter of the shank. The top surface of the head 26 is generally flat to receive the blows from the driver blade of a driving tool. The ends of the head 26 are rounded (FIG. 3), and the thickness of the head 26 at the outer ends is somewhat less than the thickness where the head joins the shank 22 so that the stress produced on the head 26 by a blow from the driver blade is distributed in a uniform manner to the shank 22. The tapered thickness of the head 26 also aids in orienting and aligning the fasteners 20.

A pair of diametrically opposed bosses or projections 28 (FIGS. 1–3) are disposed adjacent the longitudinal sides of the head 26. The bosses 28 are preferably formed as an arcuate segment of a cylinder with the distance "C" (FIG. 3) across the bosses being slightly greater than the diameter of the shank 22. The bottom surfaces of the bosses 28 are preferably flat but may be beveled at an angle of 5° to 10° to provide for ease of manufacture. The bottom surfaces of the bosses 28 intersect the cylindrical surface of the shank 22 adjacent the intersection of the shank and the lower surfaces of the head 26.

The fastener blanks 20, as shown in FIGS. 1, 2 and 3, may be produced by a stamping machine or an automatic screw machine from coils of steel wire and can be produced economically in large quantities with suitable tolerances for ordinary use. However, for use in power actuated tools, it is desirable that the fasteners be accurately aligned and glued or cemented together in sticks for use in the magazines of the tools.

The machinery for forming the fastener blanks 20 into sticks includes a conventional vibrating hopper or the like (not shown) for receiving a large quantity of the fasteners 20 in bulk. The hopper is provided with a pair of parallel rails 30 (FIGS. 4 and 5) which are separated by a distance "D" that is slightly greater than the shank diameter "B" of the fastener blanks and is slightly less than the distance "C" across the bosses 28 of the blanks. The rails 30 are vibrated to separate individual fastener blanks 20 from the mass thereof, to place the separated blanks in uniformly aligned position, and to feed the aligned blanks to other forming equipment. As the rails 30 are vibrated, the shanks 22 of the fasteners drop between the rails 30; but the fastener cannot pass completely through the space between the rails because of the heads 26 and the bosses 28 thereon. If a fastener blank falls into the space between the rails 30 with the head 26 oriented parallel to the rails as illustrated at the right in FIG. 4, the fastener blank 20 is supported on the rails by the bosses 28. If a fastener blank 20 drops between the rails 30 with its head 26 extending transverse to the rails as illustrated at the left in FIG. 4, the fastener is supported on the rails by its head 26.

The rails 30 slope slightly downward in the direction shown by the arrow in FIG. 4 so that, as the hopper and rails are vibrated, the fastener blanks gradually align themselves with their head 26 extending transverse to the rails as they move down the rails. Thus, if the bosses 28 of a fastener blank are resting on the rails 30, as shown at the right in FIG. 4, and the rails are vibrated slightly, the blank will tend to rotate about its axis to a position in which its head 26 is transverse to and rests on the rails 30.

When the fastener blanks 20 reach the ends of the rails 30 in the desired orientation, they are fed into an apparatus where the bosses 28 are flattened into the head 26 and the shanks 22 are straightened to prevent jamming or other malfunctions when the fastener is used in a driving tool. The removal of the bosses 28 permits the finished fasteners 20A to be cemented in a stick 29 (FIG. 9) with the shanks 22 abutting each other and also permits the individual finished fasteners 20A to be guided along their entire length in the drive track of a driving tool.

After the shanks 22 have been straightened and the bosses 28 removed, the partially finished fastener blanks 20 are fed into a unit of machinery in which the head portion 26 is shaved or grooved at two positions on each side spaced on opposite sides of the shank 22. This operation provides four grooves or recesses 26a (FIGS. 6–8) in the head 26 extending generally parallel to the shank 22. Portions of the surface of the recesses 26a substantially conform to portions of the peripheral surface of the shank 22 so that the finished fastener 20A can slide in a grooved drive track with the shank being guided to prevent its deflection in lateral directions from its longitudinal axis during driving. This operation completes the formation of the finished fastener 20A, and the fasteners are then cemented into sticks 29 (FIG. 9) by the use of conventional machinery. In the sticks 29, the shanks 22 of the finished fasteners 20A are secured in parallel abutting relation with the T-shaped grooved heads 26 extending transverse to the length of the stick.

FIGS. 9 and 10 of the drawings illustrate a portion of a power actuated tool with which the sticks 29 of the finished fasteners 20A can be used. More specifically, these two figures illustrate a nosepiece structure or assembly 30 having a drive track 32 formed by a front nosepiece element 34, a pair of center plates 35, and a rear nosepiece element 36. The rear nosepiece element 36 includes a recess 37 for receiving the forward end of a fastener stick guiding channel 38 which forms a part of a magazine assembly (not shown). The channel member 38 defines a recess 40 in which the depending shanks 22 of the finished fasteners 20A in the stick 29 are received, and the upper surfaces 38a of the legs of the channel member 38 which can be flat or inclined downwardly and inwardly toward the recess 40, are adapted to engage and slidably support the lower surfaces of the head portions 26 of the fasteners 20A in the stick 29. The inner end of the channel 38 and recess 40 communicates with the drive track 32 in order to allow the fasteners to move from the channel into the track for driving.

In order to provide means for guiding and slidably supporting each of the finished fasteners 20A and to prevent lateral deflection of the shank 22 as the fastener is driven, the drive track 32 is provided with three parallel guideways. A centrally positioned shank guideway 42 is defined by opposed grooves 34a and 36a formed in the front and rear nosepieces 34 and 36, respectively. A pair of head guideways 44 are positioned on both sides of and parallel to the shank guideway 42. The head guideways are defined by opposed grooves 34b and 36b formed in the front and rear nosepieces 34 and 36, respectively. Ribs 34c and 36c are defined in the front and rear nosepieces 34 and 36, respectively, between the guideways 42 and 44 and these ribs serve as guides to prevent lateral deflection of the shank 22 as the fastener is driven.

Thus, the central guideway 42 and the ribs 34c and 36c guide the shank 22 of the fastener 20A and prevent any lateral deflection of the shank 20A as it is being driven. The guideways 44 and the ribs 34c and 36c prevent the head 26 from rotating as the fastener is driven. During driving of the fastener 20A, the ribs 34c and 36c are slidably engaged with the recesses 26a formed in the head of the fastener as is shown in FIG. 9 and the outer end portions of the head 26 are slidably engaged in the guideways 44. Thus, the nosepiece assembly 30 in combination with the fastener 20A provides a means whereby a fastener having an enlarged head can be driven in power actuated driving tools with the shank of the fastener being gudied to prevent bending or lateral deflection thereof during the driving operation.

Although the present invention has been described with reference to one embodiment thereof, it will be apparent that numerous other modifications and embodiments can be devised by those skilled in the art that will fall within the spirit and scope of the present invention.

What is claimed and desired to be secured by Letters Patent of the United States is:

1. A fastener for use in a driving tool of the type having a drive track formed with a pair of spaced apart ribs disposed on opposite sides of and forming a central shank receiving guideway, said fastener comprising a shank having a flat upper end face normal to the longitudinal axis of said shank and a generally T-shaped head integrally formed with said shank at the upper end thereof, said head including outwardly extending portions formed to extend outwardly from opposite sides of said shank and generally transverse thereto, each of said portions having a flat upper surface coincident with the flat upper end face of the shank and being substantially equal in width to the diameter of said shank, each of said extending portions also including a pair of side faces each having a portion thereof aligned generally in a plane tangent to the outer peripheral surface of said shank, some of said side faces also including a groove for receiving the rib of said drive track and extending downwardly from the flat upper surface of said extending portion through said head, each of said grooves disposed adjacent said shank and having a portion of its surface substantially conforming to the shape of and coextensive with the adjacent outer peripheral surface of said shank.

2. A fastener for use in a driving tool of the type having a drive track formed with a pair of spaced apart ribs disposed on opposite sides of and forming a central shank receiving guideway, said fastener including a generally T-shaped head integrally formed at the upper end of a generally cylindrical shank having a pointed lower end and a flat upper end face extending normal to the longitudinal axis of the shank, said head comprising a pair of transversely extending portions disposed on opposite sides of said shank and extending outwardly therefrom, each of said transversely extending portions formed with a flattened top surface of substantial area lying in a common plane with the end face of said shank and an outer end portion having a width substantially equal to the diameter of said shank at a point spaced outwardly from said shank, said outer end portions being disposed outwardly adjacent to grooved portions formed in said head to extend therethrough in the direction of said shank for guidably receiving the ribs of said track when said fastener is positioned therein for driving by said tool, said grooved portions disposed adjacent said shank and the width of said head at said grooved portions being less than the diameter of the shank.

3. A fastener for use in a driving tool of the type having a drive track formed with a pair of spaced apart ribs disposed on opposite sides of and forming a central shank receiving guideway, said fastener comprising a generally T-shaped head integrally formed at the upper end of a generally cylindrical shank having a pointed lower end and a flat upper end face normal to the longitudinal axis of the shank, said head comprising a pair of outwardly extending portions disposed to extend oppositely outward from said shank, each of said portions including a flat top surface having a substantial area and disposed in common plane with the upper end face of the shank to provide an enlarged driving surface for said fastener, each of said portions having a width substantially equal to the diameter of said shank and including a tapering bottom surface formed to taper downwardly to said shank forming a thickened section adjacent the shank, each of said portions defining a pair of opposed grooves formed on opposite sides thereof and extending through said head in the direction of said shank and adjacent said shank in said thickened portion for guidably receiving the ribs of said track when the fastener is disposed therein, the distance between the innermost surfaces of opposed grooves being substantially less than the diameter of said shank and less than the width of said extending portions at a position outwardly of said grooves.

References Cited by the Examiner
UNITED STATES PATENTS

| | | | |
|---|---|---|---|
| 317,090 | 5/85 | Cave | 85—28 |
| 340,692 | 4/86 | Bailey | 85—28 |
| 2,294,463 | 9/42 | Krantz | 85—17 |
| 2,333,196 | 11/43 | Price | 29—190 |
| 2,468,821 | 5/49 | Goodstein | 85—28 |
| 2,718,647 | 9/55 | Raible | 10—54 |
| 2,764,804 | 10/56 | Arness | 29—190 |
| 2,875,664 | 3/59 | Crooks | 85—28 |
| 2,897,501 | 8/59 | True | 1—46 |
| 2,910,698 | 11/59 | Paxton | 1—46 |
| 3,019,460 | 2/62 | Corchran | 10—54 |

EDWARD C. ALLEN, *Primary Examiner.*